United States Patent
Welch (10) Patent No.: US 8,511,103 B2
(45) Date of Patent: Aug. 20, 2013

(54) VAPOR COMPRESSION SYSTEM

(75) Inventor: Andrew M. Welch, Mt. Wolf, PA (US)

(73) Assignee: Johnson Controls Technology Company, Holland, MI (US)

(*) Notice: Subject to any disclaimer, the term of this patent is extended or adjusted under 35 U.S.C. 154(b) by 687 days.

(21) Appl. No.: 12/810,411

(22) PCT Filed: Dec. 29, 2008

(86) PCT No.: PCT/US2008/088391
§ 371 (c)(1),
(2), (4) Date: Jun. 24, 2010

(87) PCT Pub. No.: WO2009/086493
PCT Pub. Date: Jul. 9, 2009

(65) Prior Publication Data
US 2010/0269524 A1    Oct. 28, 2010

Related U.S. Application Data

(60) Provisional application No. 61/017,338, filed on Dec. 28, 2007.

(51) Int. Cl.
*F25B 7/00* (2006.01)
*F25D 17/00* (2006.01)

(52) U.S. Cl.
USPC ............................................. 62/175; 62/181

(58) Field of Classification Search
USPC ................ 62/175, 196.1, 510, 180, 181, 210
See application file for complete search history.

(56) References Cited

U.S. PATENT DOCUMENTS

| 5,115,644 A | 5/1992 | Alsenz |
| 5,692,387 A * | 12/1997 | Alsenz et al. ................... 62/184 |
| 5,694,780 A * | 12/1997 | Alsenz ............................ 62/117 |
| 7,600,390 B2 * | 10/2009 | Manole ....................... 62/228.1 |

FOREIGN PATENT DOCUMENTS

GB    2152649 A    8/1985

OTHER PUBLICATIONS

J. Dieckmann and J. Brodrick, "What's Easiest Is Not Always Best", ASHRAE Journal, Sep. 2009, pp. 84-88, vol. 51, No. 9.
Khan, Jameel-ur-Rehman et al., "Design and Rating of an Integrated Mechanical-Subcooling Vapor-Compression Refrigeration System", Energy Conversion and Management, vol. 41, No. 11, Jul. 2000, pp. 1201-1222.

* cited by examiner

*Primary Examiner* — Chen Wen Jiang
(74) *Attorney, Agent, or Firm* — McNees Wallace & Nurick LLC (57) ABSTRACT

A method and system for controlling operation of a vapor compression system (13) includes monitoring at least one component condition of the system (13), comparing a predetermined setpoint to the at least one component condition, and loading or unloading at least one of a first compressor (18) or a second compressor (20) of the system (13) in response to the comparison of the predetermined setpoint to the at least one component condition.

20 Claims, 8 Drawing Sheets

VAPOR COMPRESSION SYSTEM

CROSS-REFERENCE TO RELATED APPLICATIONS

This application claims priority from and the benefit of U.S. Provisional Application No. 61/017,338, entitled ECONOMIZED VAPOR COMPRESSION SYSTEM, filed Dec. 28, 2007, which is hereby incorporated by reference.

BACKGROUND

The application generally relates to a vapor compression system. More specifically, the application relates to a system and method to control the intermediate pressure in an economized vapor compression system.

A vapor compression system can include refrigerant gas compressed by a compressor and passed to a condenser where it exchanges heat with another fluid, for example, air or water, and is condensed to a liquid. From the condenser, the liquid refrigerant can pass through an expansion device and then to an evaporator, where the refrigerant exchanges heat with another fluid, for example, air or water, and is evaporated to a gas. The refrigerant gas can return to the compressor from the evaporator and the cycle is repeated.

Economizer circuits can be utilized in vapor compression systems to provide increased cooling capacity, efficiency, and performance when compared to systems without economizer circuits. An economizer circuit utilizing one or more additional expansion devices can be incorporated downstream of the condenser. For a system utilizing one additional expansion device, a first expansion device can expand the refrigerant from condenser pressure to an intermediate pressure between condenser pressure and evaporator pressure, resulting in the flashing of some of the refrigerant to a vapor. The flashed vapor refrigerant can be provided back to the compressor. The remaining liquid refrigerant at the intermediate pressure from the first expansion device is now at a lower enthalpy. A second expansion device can expand the lower enthalpy liquid refrigerant from the intermediate pressure to evaporator pressure. The refrigerant can then enter the evaporator with lower enthalpy, thereby increasing the cooling capacity of vapor compression systems with economizing circuits versus non-economized systems in which the refrigerant is expanded directly from the condenser.

An economized vapor compression system can also include a flash tank and an additional expansion device. In flash tank economizer circuits, the first expansion device is provided upstream of the flash tank. Liquid refrigerant flows through the first expansion device and into the flash tank. Upon entering the flash tank, the liquid refrigerant experiences a substantial pressure drop, and at least a portion of the refrigerant rapidly expands or "flashes" and is converted from a liquid phase to a vapor phase at an intermediate pressure. Any remaining liquid refrigerant gathers at the bottom of the tank for return to the main refrigerant line upstream of the second expansion device. Vapor refrigerant is returned from the flash tank to the compressor, either at the suction inlet to the compressor or at an intermediate stage of compression. Since the refrigerant gas returned to the compressor from the flash tank is at an intermediate pressure, the refrigerant vapor requires less compression, thereby increasing overall system efficiency.

Introducing gas refrigerant from a flash tank economizer to a compressor suction inlet or to an intermediate stage of compression in a multi-stage compressor can be problematic. A first stage compressor may handle the flow from the evaporator while a higher stage compressor handles the flow from the first stage compressor discharge as well as the flow from the economizer. In conventional systems, the economizer operating conditions can be dictated by the overall system conditions and operating point, thereby prohibiting independent control of the economizer operating pressure and flow rate. Without such independent control, the economizer and second stage compressor must be designed for specific operating conditions. Further, introducing gaseous refrigerant from the economizer circuit in systems having only a single-stage compressor can be problematic because there is no mechanical device or method to operate the compressor at a pressure level between the evaporator and condenser.

SUMMARY

The present invention relates to a method of operating a vapor compression system including providing a first fluid circuit comprising a first compressor, a condenser and an evaporator, providing a second fluid circuit connected to the first fluid circuit between the condenser and evaporator to receive fluid from the first fluid circuit. The second fluid circuit including a vessel configured and positioned to receive fluid from the first fluid circuit and a second compressor configured and positioned to receive vapor from the vessel and to discharge compressed vapor to the first fluid circuit. The method further including monitoring a plurality of operating parameters of the first fluid circuit, calculating an operating condition setpoint for the vessel based on the monitored plurality of operating parameters, and monitoring an operating condition of the vessel corresponding to the calculated operating condition setpoint. The method also includes comparing the calculated operating condition setpoint to the monitored operating condition and adjusting the capacity of the second compressor in response to the comparison of the calculated operating condition setpoint and the monitored operating condition.

The present invention also relates to a vapor compression system including a condenser, a vessel, an evaporator, and a first compressor connected by a first refrigerant line and a second refrigerant line connecting an output of the vessel and the first refrigerant line. The system further includes a second compressor configured and positioned to receive the output of the vessel, a sensor configured and positioned to measure a value representative of an operating parameter of the vessel, and a controller comprising a control algorithm configured to adjust the capacity of the second compressor in response to the measured value.

The present invention further relates to a method of operating a vapor compression system. The method includes providing a first fluid circuit including a first compressor, a condenser and an evaporator and providing a second fluid circuit connected to the first fluid circuit between the condenser and evaporator to receive fluid from the first fluid circuit. The second fluid circuit including a vessel configured and positioned to receive fluid from the first fluid circuit and a second compressor configured and positioned to receive vapor from the vessel and to discharge compressed vapor to the first fluid circuit. The method further includes monitoring a leaving chilled fluid temperature at the evaporator, monitoring a leaving chilled fluid temperature setpoint, and comparing the monitored leaving chilled fluid temperature to the leaving chilled fluid temperature setpoint. The method also includes decreasing capacity of the first compressor in response to the monitored leaving chilled fluid temperature being less than or equal to the leaving chilled fluid temperature setpoint, determining whether the first compressor is operating at maximum capacity, increasing capacity of the first compressor in response to the determination of the first compressor operating at less than maximum capacity and the monitored leaving chilled fluid temperature being greater than the leaving chilled fluid temperature setpoint, and increasing capacity of the second compressor in response to the determination of the first compressor operating at maximum capacity and the monitored leaving chilled fluid temperature being greater than the leaving chilled fluid temperature setpoint.

DETAILED DESCRIPTION OF THE EXEMPLARY EMBODIMENTS

Figure 1:
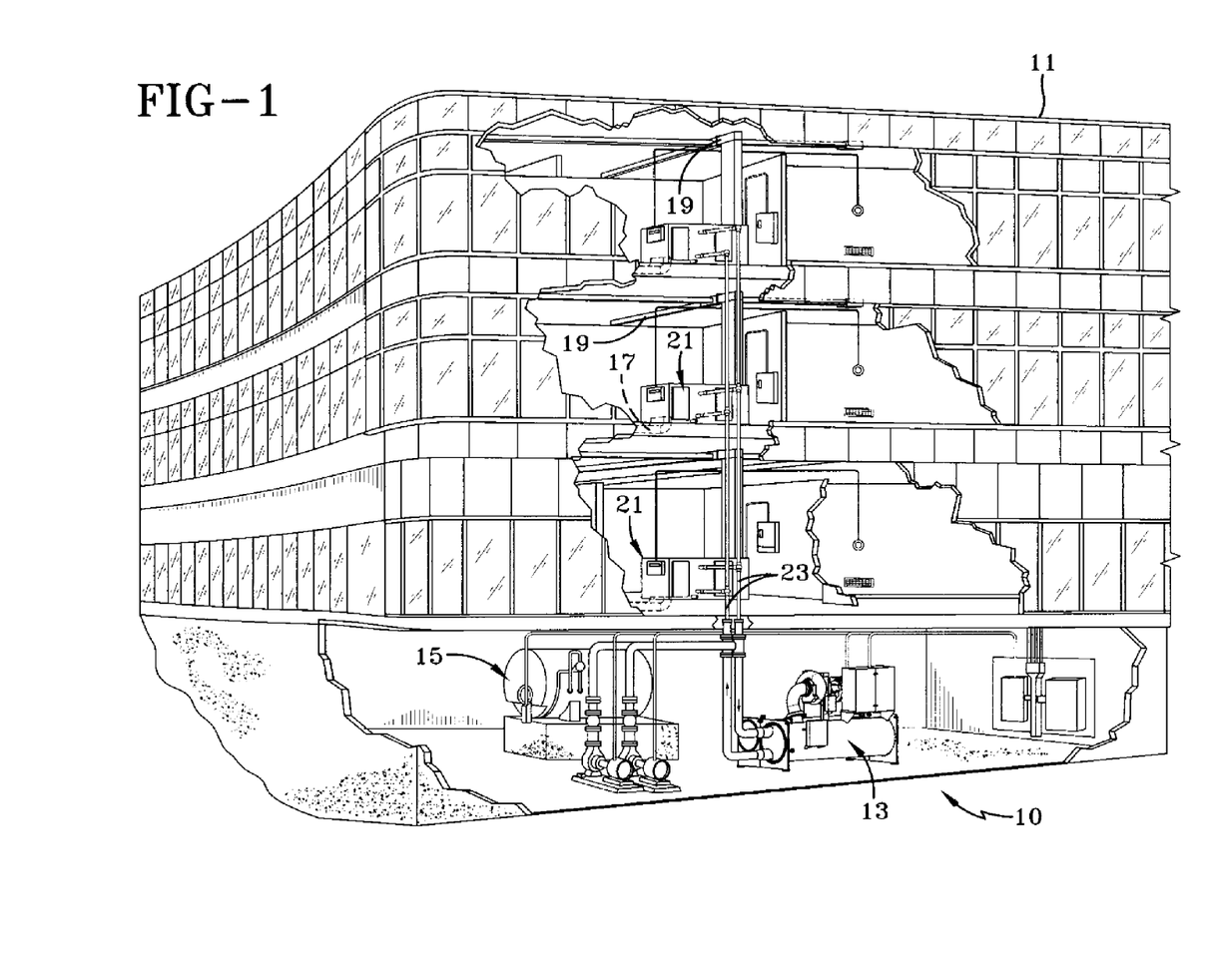
FIG. 1 shows an exemplary embodiment of a heating, ventilation, and air conditioning system in a commercial environment.

Referring to FIG. 1, an exemplary environment for a heating, ventilation, and air conditioning (HVAC) system 10 in a building 11 for a typical commercial setting is shown. HVAC system 10 may include a vapor compression system 13 incorporated into a basement unit that may supply a chilled liquid that may be used to cool building 11. HVAC system 10 may also include a boiler 15 to supply a heated liquid that may be used to heat building 11, and an air distribution system that circulates air through building 11. The air distribution system may include an air return duct 17, an air supply duct 19 and an air handler 21. Air handler 21 may include a heat exchanger (not shown) that is connected to boiler 15 and vapor compression system 13 by conduits 23. The heat exchanger in air handler 21 may receive either heated liquid from boiler 15 or chilled liquid from vapor compression system 13 depending on the mode of operation of HVAC system 10. HVAC system 10 is shown with a separate air handler 21 on each floor of building 11. Several air handlers 21 may service a single floor, or one air handler may service more than one floor.

Figure 2:
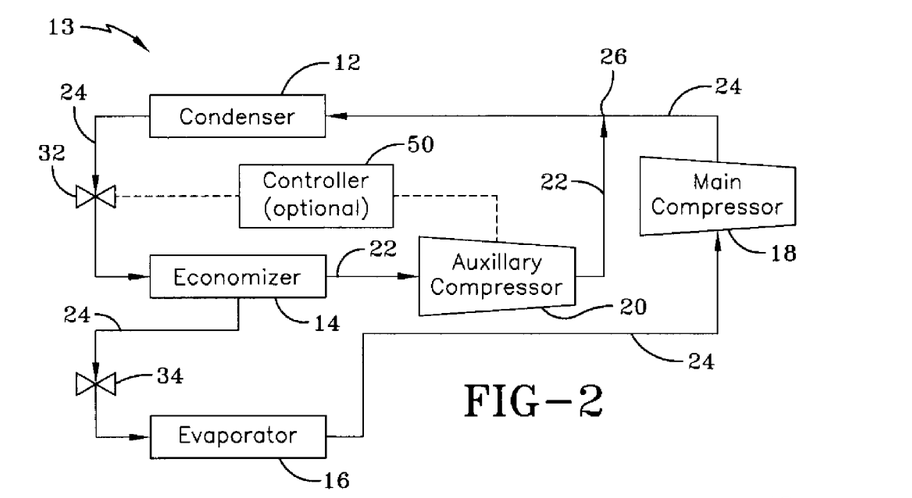
FIG. 2 schematically shows an exemplary embodiment of a vapor compression system.
Figure 3:
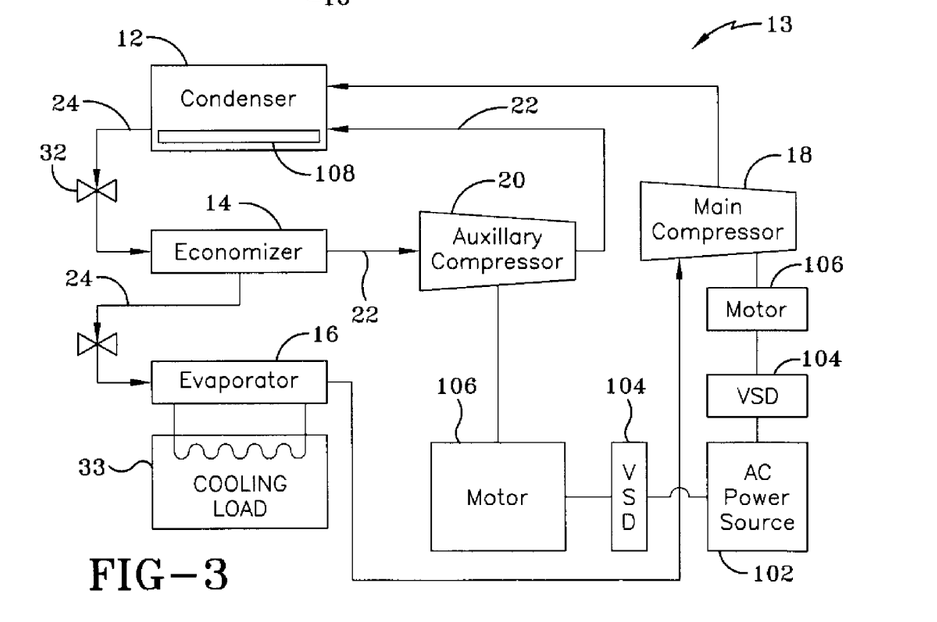
FIG. 3 schematically shows another exemplary embodiment of a vapor compression system.

Referring to FIGS. 2 and 3, schematic representations of vapor compression systems 13 are shown. Referring to FIG. 3, an AC power source 102 supplies power to variable speed drives (VSDs) 104, which power one or more motors 106. Motor(s) 106 can be used to drive a corresponding compressor 18, 20 that supplies compressed refrigerant gas to a condenser 12. In an exemplary embodiment, compressor 18 can be a main compressor and compressor 20 can be an auxiliary compressor. In another exemplary embodiment, compressor 18 can be a high stage compressor and compressor 20 can be a low stage compressor. In yet another exemplary embodiment, compressor 20 can be a main compressor and compressor 18 can be an auxiliary compressor.

The output capacity of compressor 18, 20 may be based upon the operating speed of compressor 18, 20, which operating speed is dependent on the output speed of motor 106 driven by VSD 104. For example, the motors can be switched reluctance (SR) motors, induction motors, electronically commutated permanent magnet motors (ECM), or any other suitable motor type. In an alternate embodiment, other drive mechanisms such as steam or gas turbines or engines and associated components can be used to drive the compressors.

Referring again to FIGS. 2 and 3, compressed gaseous refrigerant from compressor 18 can be condensed into liquid refrigerant in condenser 12. The refrigerant vapor delivered by compressor 18 to condenser 12 enters into a heat exchange relationship with a fluid, for example, air or water, and undergoes a phase change to a refrigerant liquid as a result of the heat exchange relationship with the fluid. The condenser 12 may also includes a sub-cooler 108 for the liquid refrigerant, as shown in FIG. 3. Some examples of refrigerants that may be used in system 13 are hydrofluorocarbon (HFC) based refrigerants, e.g., R-410A, R-407, R-134a, carbon dioxide, $CO_2$, (R-744), ammonia, $NH_3$, (R-717), and any other suitable type of refrigerant.

Condenser 12 can be fluidly connected to an economizer 14 by a main refrigerant line 24. Economizer 14 can be any type of heat exchanger or other device in which a portion of the refrigerant is vaporized. In an exemplary embodiment, economizer 14 may be a flash tank or vessel. Along main refrigerant line 24, between condenser 12 and economizer 14, is a first expansion device 32. First expansion device 32 can be used to adjust the operating pressure of economizer 14.

Main refrigerant line 24 can connect economizer 14 to an evaporator 16. Liquid refrigerant can exit economizer 14 and enter evaporator 16 via main refrigerant line 24. The liquid refrigerant from economizer 14 delivered to evaporator 16 can enter into a heat exchange relationship with another fluid, which may or may not be the same type of fluid used for condenser 12, and undergo a phase change to a refrigerant vapor as a result of the heat exchange relationship with the fluid. A second expansion device 34 on main refrigerant line 24 can be between economizer 14 and evaporator 16. Any suitable expansion device may be used for first expansion device 32 and second expansion device 34. In an exemplary embodiment, the expansion devices may be expansion valves. In the exemplary embodiment shown in FIG. 3, evaporator 16 may be connected to a cooling load 33 by a supply line and a return line. A process fluid—for example, water, ethylene glycol, calcium chloride brine, sodium chloride brine, or any other suitable liquid—enters evaporator 16 via the return line and exits evaporator 16 via the supply line. Evaporator 16 chills the temperature of the process fluid. Evaporator 16 can include a plurality of tubes and/or one or more tube bundles for circulating the process fluid. The vapor refrigerant exits evaporator 16 and returns to compressor 18 by a suction line to complete the cycle.

Figure 4:
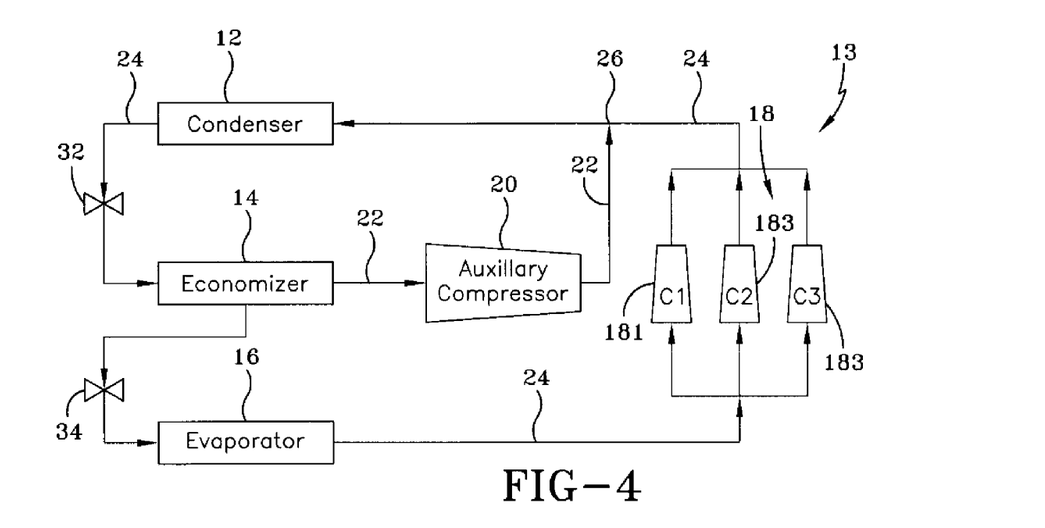
FIG. 4 schematically shows another exemplary embodiment of a vapor compression system.

From evaporator 16, main refrigerant line 24 can carry the now gaseous refrigerant to compressor 18. Compressor 18 can compress the refrigerant flowing from evaporator 16 to a higher pressure and return the compressed refrigerant gas to condenser 12 via main refrigerant line 24, completing a main refrigerant circuit of system 13. In an exemplary embodiment, compressor 18 may be a single-stage compressor, such as a screw compressor, reciprocating compressor, centrifugal compressor, rotary compressor, swing link compressor, scroll compressor, turbine compressor, or any other suitable compressor, although any single-stage or multi-stage compressor could be used. As shown in FIG. 4, compressor 18 can include two or more single-stage compressors 181, 182, 183 arranged in parallel, wherein each compressor can be independently controlled.

An auxiliary refrigerant line 22 can be fluidly connected to economizer 14. Auxiliary refrigerant line 22 can carry gaseous refrigerant from economizer 14 to compressor 20. Compressor 20 is separate and distinct from compressor 18 and can be dedicated to compressing refrigerant leaving economizer 14 via auxiliary refrigerant line 22. In an exemplary embodiment, compressor 20 is a single compressor, e.g., a screw compressor, a centrifugal compressor or other single-stage compressor, although a bank of multiple compressors in parallel may be provided. However, like compressor 18, any type of compressor having any number of stages could be used as compressor 20. Compressor 20 can compress gaseous refrigerant leaving economizer 14 to a higher pressure, following which the compressed gaseous refrigerant can be combined with the refrigerant leaving compressor 18. From compressor 20, auxiliary refrigerant line 22 can connect back to main refrigerant line 24 at a common discharge location 26, which location can be at some point after compressor 18 and prior to, or at, condenser 12, completing an economized refrigerant circuit of system 13. The discharge pressure from compressor 20 can be substantially equal to the discharge pressure from the compressor 18. A check valve or other similar type of valve can be incorporated downstream from compressor 20 to prevent any flow of refrigerant gas from compressor 18 through compressor 20 that would result in reverse rotation of compressor 20.

Referring to FIG. 2, a controller 50 in electronic communication with compressor 20 and with first expansion device 32 can provide automated control. Controller 50 can be in one-way communication with a plurality of sensors positioned throughout system 13 to monitor changes in pressure, saturation temperature, flow rate, and any other properties desired to be monitored. Controller 50 can include at least a microprocessor and a memory device. The microprocessor can be configured such that in response to measured changes in system 13, controller 50 sends control signals to the capacity control mechanism of compressor 20 to adjust the economizer operating pressure to the selected operating pressure. Compressor capacity control may be performed by any method available to the given compressor type. Controller 50 may further send control signals to system expansion devices 32, 34 in anticipation of system operating condition changes. Controller 50 can also include an analog to digital (A/D) converter, a non-volatile memory, and an interface board to control operation of the refrigerant system 13. Controller 50 can execute a control algorithm(s) to control operation of system 13. The control algorithm can be embodied in a computer program(s), executed by the microprocessor, and/or implemented and executed using any suitable digital and/or analog hardware. If hardware is used to execute the control algorithm, the corresponding configuration of controller 50 can be changed to incorporate the necessary components and to remove any components that may no longer be required. In other exemplary embodiments, controller 50 may be used with the systems shown in FIGS. 3 through 5.

Economizer 14 may be operated at any desired pressure. Economizer 14 can be operated at a pressure within a predetermined pressure range, which may be a range of possible operating pressures ranging from a high pressure that represents condenser pressure to a low pressure that represents evaporator pressure. The range may depend on a number of factors, some of which are permanent or semi-permanent, such as the type of refrigerant and type of compressor and associated operating characteristics, while other factors vary based on the particular operating conditions or load experienced by the overall system.

Figure 5:
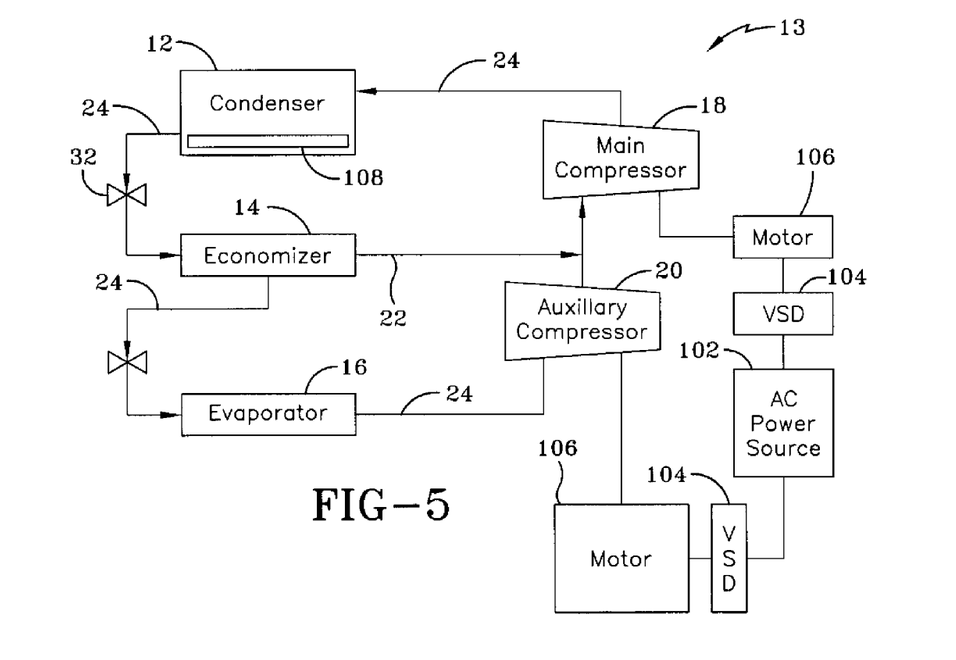
FIG. 5 schematically shows another exemplary embodiment of a vapor compression system.

Referring to FIG. 5, compressor 18 and compressor 20 can be independently controlled. The gaseous refrigerant leaving economizer 14 can be supplied to auxiliary refrigerant line 22 at a point somewhere between the discharge of compressor 20 and the suction of compressor 18. The pressure of the gaseous refrigerant leaving economizer 14 can be substantially equal to the discharge pressure from compressor 20. A check valve or other similar type of valve can be incorporated downstream from economizer 14 to prevent any flow of refrigerant gas from compressor 20 to economizer 14.

Figure 6:
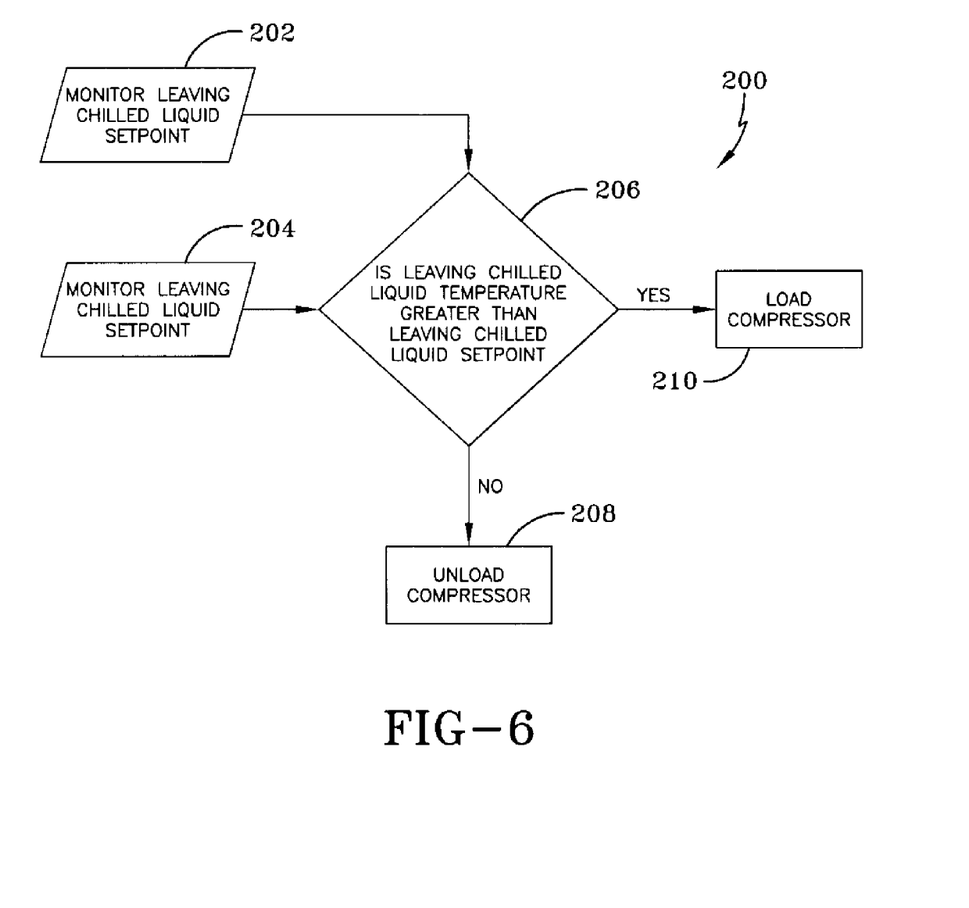
FIG. 6 is a flow chart showing an exemplary embodiment of a process of operating a vapor compression system.

Referring to FIG. 6, controller 50 can execute a control algorithm 200 for compressor 18 and/or compressor 20. Control algorithm 200 can include monitoring leaving chilled liquid temperature at the evaporator (step 202) and monitoring a leaving chilled liquid setpoint (step 204). Control algorithm 200 can further include comparing the leaving chilled liquid temperature and the leaving chilled liquid setpoint (step 206). If the leaving chilled liquid temperature is not greater than the leaving chilled liquid setpoint, then the compressor is unloaded (step 208). If the leaving chilled liquid temperature is greater than the leaving chilled liquid setpoint, then the compressor is loaded (step 210). Compressor 18 and/or compressor 20 can be either loaded or unloaded, using any appropriate methods for the type of compressor used, based on the result of the comparison of the leaving chilled liquid temperature and the leaving chilled liquid setpoint. For example, if the compressor is a centrifugal compressor, then the compressor may be loaded or unloaded by controlling the pre-rotation vanes for the compressor, the variable geometry diffuser for the compressor, and/or the variable speed drive for the compressor.

Figure 7:
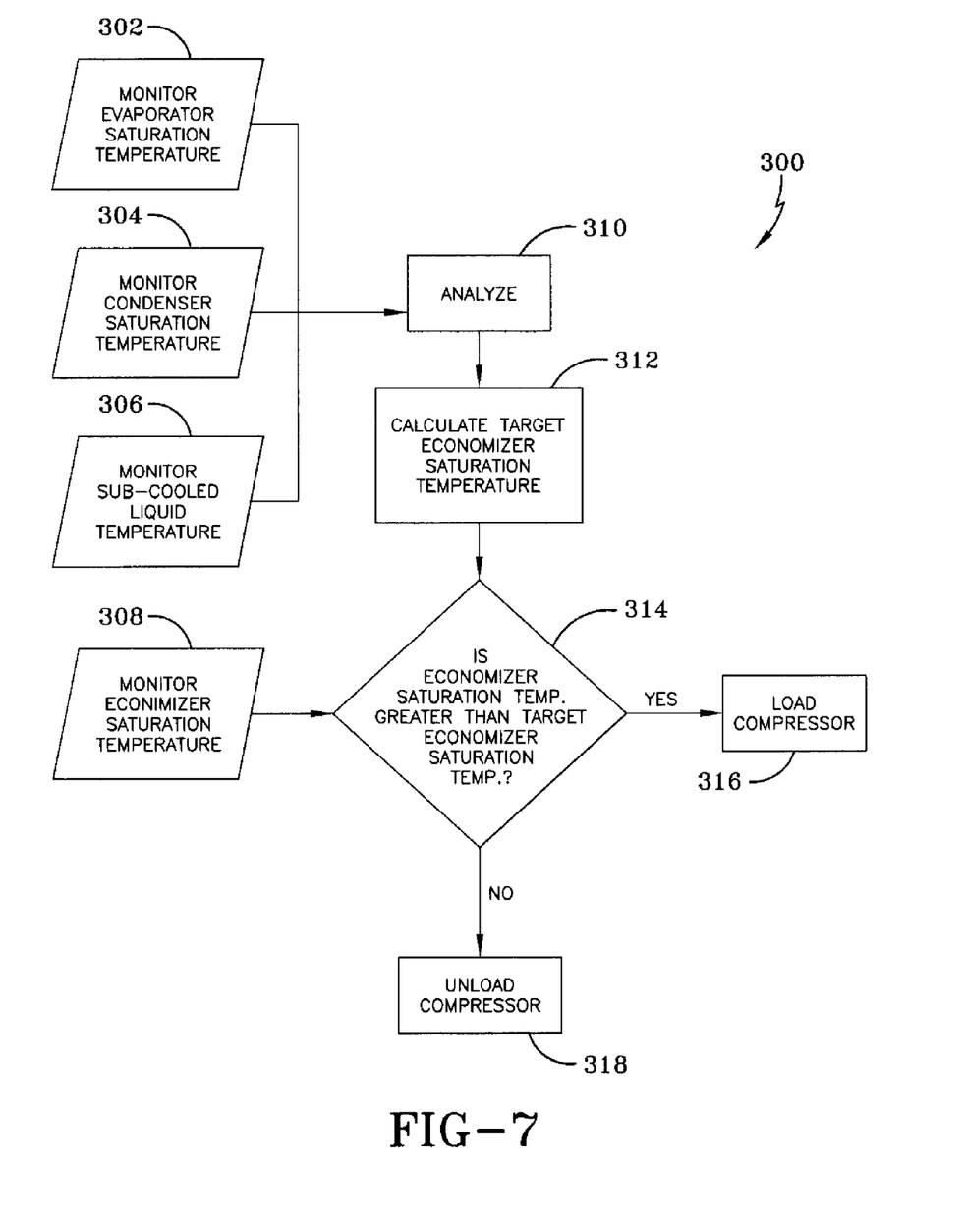
FIG. 7 is a flow chart showing an exemplary embodiment of a process of operating a vapor compression system.

Referring to FIG. 7, controller 50 can execute a control algorithm 300 for compressor 18 and/or compressor 20. Control algorithm 300 can include monitoring the evaporator saturation temperature (step 302), monitoring the condenser saturation temperature (step 304), and monitoring the sub-cooled liquid temperature in the condenser (step 306). Control algorithm 300 can further include analyzing the evaporator saturation temperature, the condenser saturation temperature, and the sub-cooled liquid temperature (step 310) to calculate a target economizer saturation temperature (step 312). Control algorithm 300 can further include monitoring the economizer saturation temperature (step 308), and comparing the economizer saturation temperature to the target economizer saturation temperature (step 314). If the economizer saturation temperature is greater than the target economizer saturation temperature, then the compressor is loaded (step 316). If the economizer saturation temperature is not greater then the target economizer saturation temperature, then the compressor is unloaded (step 318). Additionally, in another embodiment, if the process of FIG. 7 for controlling the compressor is not satisfying demand (for example, the cooling load exceeds the cooling capacity available based on the target economizer saturation temperature), then algorithm 200 can be used for controlling the compressor until the measured economizer saturation temperature either equals or exceeds the target economizer saturation temperature.

In one exemplary embodiment, compressor 18 is controlled by control algorithm 200 and compressor 20 is controlled by control algorithm 300. In another exemplary embodiment, the liquid level in the economizer and the deviation of the liquid level from a setpoint liquid level can be used to control compressor 18 and/or compressor 20, where the expansion device is controlled to maintain the intermediate operating condition. In yet another exemplary embodiment, algorithms 200, 300 incorporate monitoring, analyzing, calculating, and/or comparing other conditions (for example, pressure).

Figure 8:
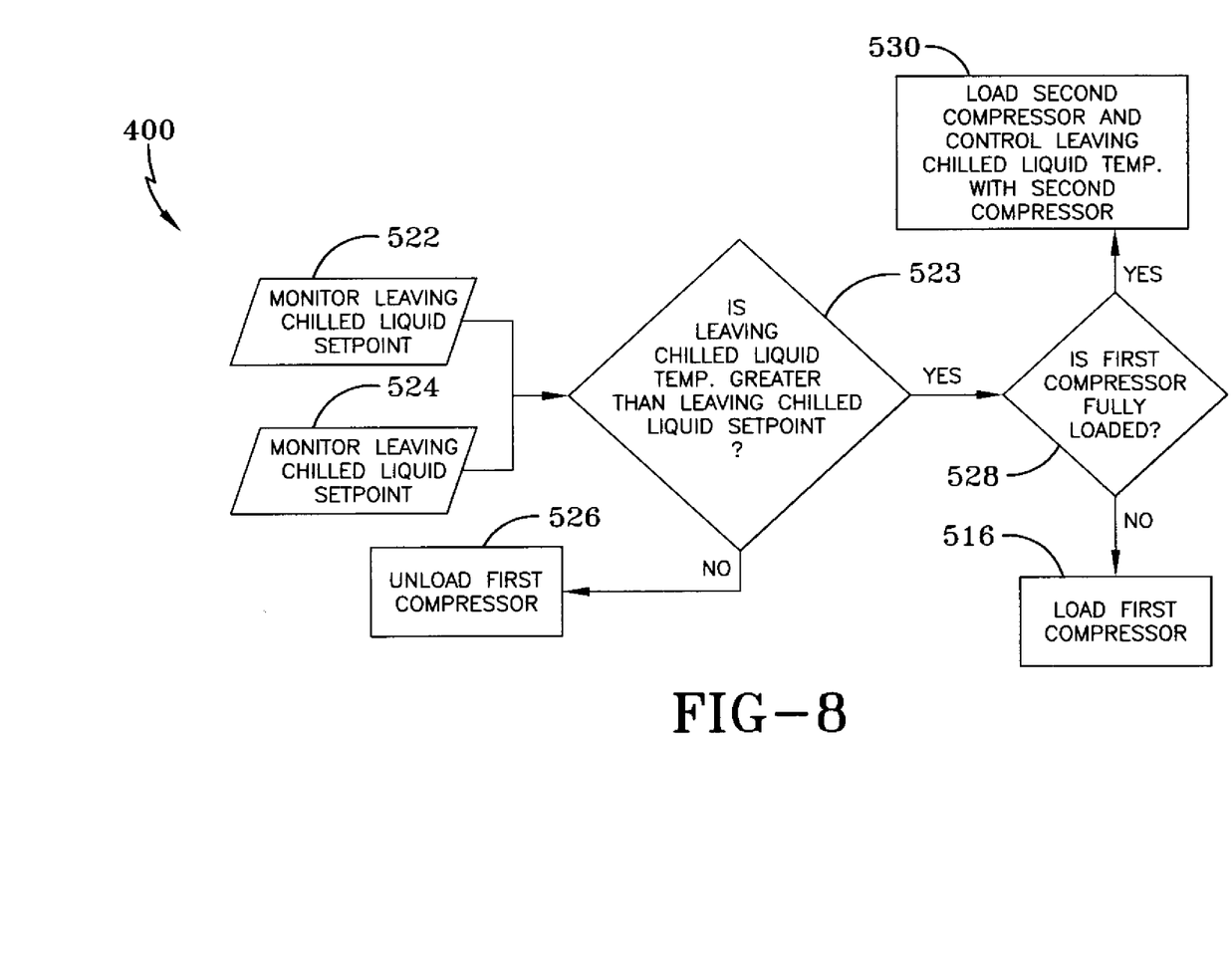
FIG. 8 is a flow chart showing an exemplary embodiment of a process of operating a vapor compression system.

Referring to FIG. 8, controller 50 can execute a control algorithm 400 for operating a first compressor (for example, compressor 18) and a second compressor (for example, compressor 20). Control algorithm 400 can include a determination of whether the leaving chilled liquid temperature at the evaporator is greater than the leaving chilled liquid setpoint (step 523). The determination can include monitoring leaving chilled liquid temperature (step 522) and monitoring a leaving chilled liquid setpoint (step 524). If the leaving chilled liquid temperature is not greater than the leaving chilled liquid setpoint, then the first compressor is unloaded (step 526). If the leaving chilled liquid temperature is greater than the leaving chilled liquid setpoint, then a determination of whether the first compressor is fully loaded is performed (step 528). If the first compressor is not fully loaded, then the first compressor is loaded (step 516). If the first compressor is fully loaded, then the second compressor is loaded and the leaving chilled liquid temperature is controlled with the second compressor (step 530). The first compressor and/or the second compressor can be loaded or unloaded using any appropriate method or technique.

Figure 9A:
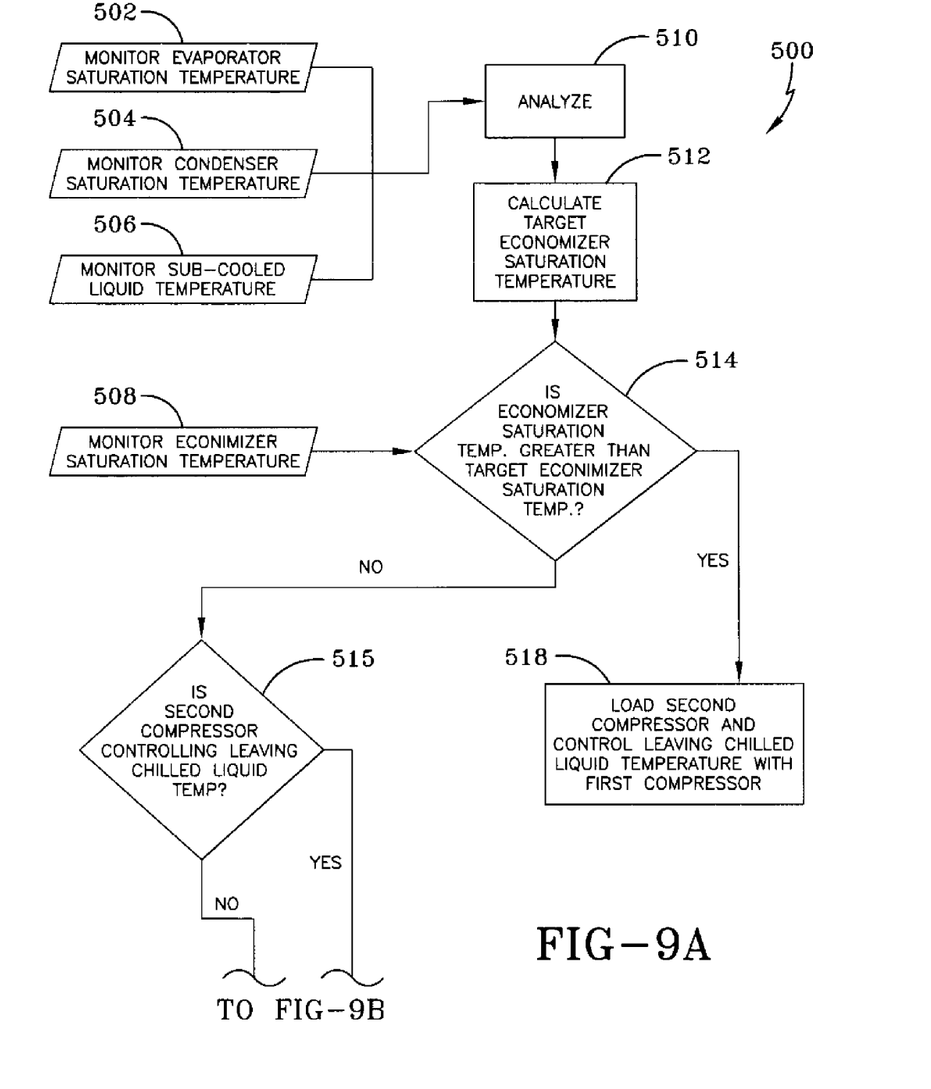
FIGS. 9A and 9B are a flow chart showing an exemplary embodiment of a process of operating a vapor compression system.
Figure 9B:
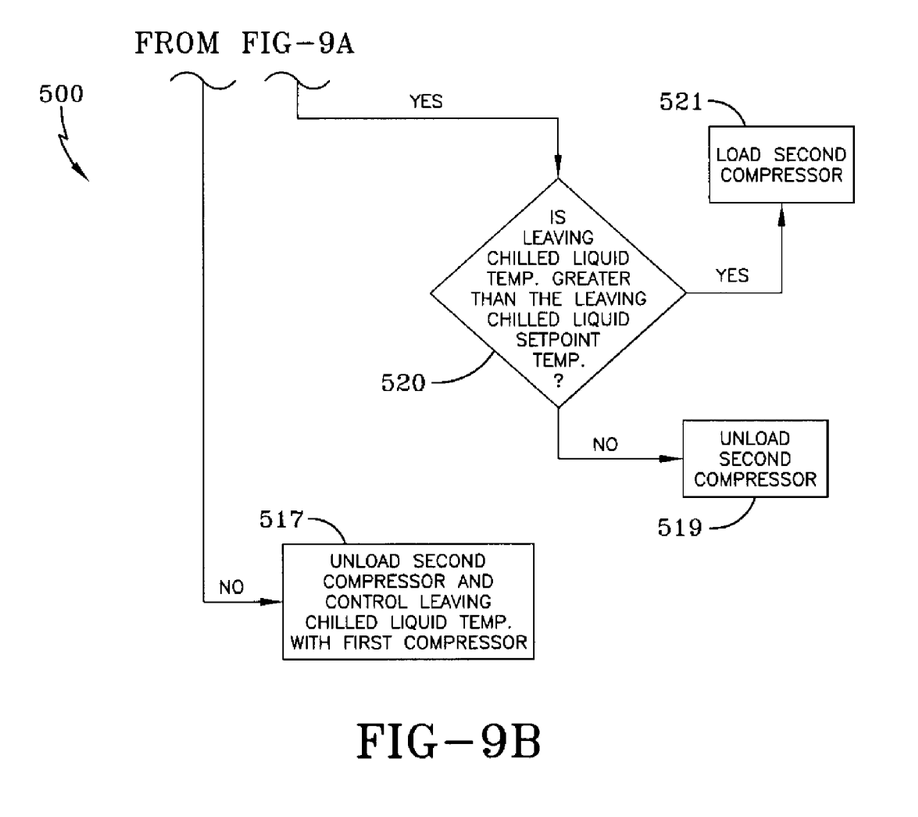

Referring to FIGS. 9A and 9B, controller 50 can execute a control algorithm 500 for the first compressor and the second compressor. Control algorithm 500 can include monitoring the evaporator saturation temperature (step 502), monitoring the condenser saturation temperature (step 504), and monitoring the sub-cooled liquid temperature (step 506). Control algorithm 500 can further include analyzing the evaporator saturation temperature, the condenser saturation temperature, and the sub-cooled liquid temperature (step 510) to calculate a target economizer saturation temperature (step 512). Control algorithm 500 can further include monitoring the economizer saturation temperature (step 508), and comparing the economizer saturation temperature to the target economizer saturation temperature (step 514). If the economizer saturation temperature is greater than the target economizer saturation temperature, then the second compressor is loaded and the leaving chilled liquid temperature is controlled with the first compressor (step 518). If the economizer saturation temperature is not greater than the target economizer saturation temperature, then a determination of whether the second compressor controls the chilled liquid temperature is performed (step 515). If the second compressor does control the chilled liquid temperature, then a determination of whether the leaving chilled liquid temperature is greater than the leaving chilled liquid setpoint (step 520). If the leaving chilled liquid temperature is not greater than the leaving chilled liquid setpoint, then the second compressor is unloaded (step 519). If the leaving chilled liquid temperature is greater than the leaving chilled liquid setpoint, then the second compressor is loaded (step 521). If the second compressor does not control the chilled liquid temperature, then the second compressor is unloaded and the leaving chilled liquid temperature is controlled with the first compressor (step 517).

While only certain features and embodiments of the invention have been shown and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A method of operating a vapor compression system comprising:
providing a first fluid circuit comprising a first compressor, a condenser and an evaporator;
providing a second fluid circuit connected to the first fluid circuit between the condenser and evaporator to receive fluid from the first fluid circuit, the second fluid circuit comprising a vessel configured and positioned to receive fluid from the first fluid circuit and a second compressor configured and positioned to receive vapor from the vessel and to discharge compressed vapor to the first fluid circuit;
monitoring a plurality of operating parameters of the first fluid circuit;
calculating an operating condition setpoint for the vessel based on the monitored plurality of operating parameters;
monitoring an operating condition of the vessel corresponding to the calculated operating condition setpoint;
comparing the calculated operating condition setpoint to the monitored operating condition; and
adjusting the capacity of the second compressor in response to the comparison of the calculated operating condition setpoint and the monitored operating condition.

2. The method of claim 1, wherein the step of calculating an operating condition setpoint comprises calculating a saturation temperature setpoint for the vessel based on the monitored plurality of operating parameters.

3. The method of claim 2, wherein the step of monitoring a plurality of operating parameters comprises:
monitoring condenser saturation temperature;
monitoring evaporator saturation temperature; and
monitoring condenser liquid temperature.

4. The method of claim 2, wherein the step of monitoring an operating condition of the vessel comprises monitoring a saturation temperature of the vessel.

5. The method of claim 1, wherein the step of adjusting the capacity of the second compressor comprises increasing capacity of the second compressor in response to the monitored operating condition being greater than the calculated operating condition setpoint.

6. The method of claim 1, wherein the step of adjusting the capacity of the second compressor comprises decreasing capacity of the second compressor in response to the monitored operating condition being less than or equal to the calculated operating condition setpoint.

7. The method of claim 1, further comprising determining whether the second compressor or first compressor is controlling leaving chilled fluid temperature at the evaporator.

8. The method of claim 7, further comprising;
monitoring a leaving chilled fluid temperature at the evaporator;
monitoring a leaving chilled fluid temperature setpoint; and
comparing the monitored leaving chilled fluid temperature to the leaving chilled fluid temperature setpoint.

9. The method of claim 8, wherein the step of adjusting the capacity of the second compressor comprises increasing capacity of the second compressor in response to the monitored operating condition being less than or equal to the calculated operating condition setpoint, the determination of the second compressor controlling leaving chilled fluid temperature, and the monitored leaving chilled fluid temperature being greater than the leaving chilled fluid temperature setpoint.

10. The method of claim 8, wherein the step of adjusting the capacity of the second compressor comprises decreasing capacity of the second compressor in response to the monitored operating condition being less than or equal to the calculated operating condition setpoint, the determination of the second compressor controlling leaving chilled fluid temperature, and the monitored leaving chilled fluid temperature being less than or equal to the leaving chilled fluid temperature setpoint.

11. The method of claim 7, wherein the step of adjusting the capacity of the second compressor comprises decreasing capacity of the second compressor in response to the monitored operating condition being less than or equal to the calculated operating condition setpoint and the determination of the first compressor controlling leaving chilled fluid temperature.

12. A vapor compression system comprising:
a condenser, a vessel, an evaporator, and a first compressor connected by a first refrigerant line;
a second refrigerant line connecting an output of the vessel and the first refrigerant line;
a second compressor configured and positioned to receive the output of the vessel;
a sensor configured and positioned to measure a value representative of an operating parameter of the vessel; and
a controller comprising a control algorithm configured to adjust the capacity of the second compressor in response to the measured value.

13. The system of claim 12, wherein the second compressor is positioned in the second refrigerant line and the second refrigerant line connects a discharge of the second compressor to the first refrigerant line at a location between a discharge of the first compressor and the condenser.

14. The system of claim 12, wherein the vessel comprises a flash tank.

15. The system of claim 12, wherein at least one of the first compressor or the second compressor comprises a plurality of compressors connected in parallel.

16. The system of claim 12, wherein the second refrigerant line connects to the first refrigerant line at a location between the first compressor and the second compressor.

17. A method of operating a vapor compression system comprising:
providing a first fluid circuit comprising a first compressor, a condenser and an evaporator;
providing a second fluid circuit connected to the first fluid circuit between the condenser and evaporator to receive fluid from the first fluid circuit, the second fluid circuit comprising a vessel configured and positioned to receive fluid from the first fluid circuit and a second compressor configured and positioned to receive vapor from the vessel and to discharge compressed vapor to the first fluid circuit;
monitoring a leaving chilled fluid temperature at the evaporator;
monitoring a leaving chilled fluid temperature setpoint; and
comparing the monitored leaving chilled fluid temperature to the leaving chilled fluid temperature setpoint;
decreasing capacity of the first compressor in response to the monitored leaving chilled fluid temperature being less than or equal to the leaving chilled fluid temperature setpoint;
determining whether the first compressor is operating at maximum capacity;
increasing capacity of the first compressor in response to the determination of the first compressor operating at less than maximum capacity and the monitored leaving chilled fluid temperature being greater than the leaving chilled fluid temperature setpoint; and
increasing capacity of the second compressor in response to the determination of the first compressor operating at maximum capacity and the monitored leaving chilled fluid temperature being greater than the leaving chilled fluid temperature setpoint.

18. The method of claim 17, further comprising:
monitoring a plurality of operating parameters of the first fluid circuit;
calculating an operating condition setpoint for the vessel based on the monitored plurality of operating parameters;
monitoring an operating condition of the vessel corresponding to the calculated operating condition setpoint;
comparing the calculated operating condition setpoint to the monitored operating condition; and
adjusting the capacity of the second compressor in response to the comparison of the calculated operating condition setpoint to the monitored operating condition and the determination of the first compressor operating at less than maximum capacity.

19. The method of claim 18, further comprising decreasing capacity of the second compressor in response to the determination of the first compressor operating at maximum capacity, the monitored leaving chilled fluid temperature being greater than the leaving chilled fluid temperature setpoint and the monitored operating condition being less than or equal to the calculated operating condition setpoint.

20. The method of claim 18, wherein the step of adjusting the capacity of the second compressor comprises:
increasing capacity of the second compressor in response to the monitored operating condition being greater than the calculated operating condition setpoint; and
decreasing capacity of the second compressor in response to the monitored operating condition being less than or equal to the calculated operating condition setpoint.

* * * * *